United States Patent [19]
Weddle et al.

[11] Patent Number: 5,359,595
[45] Date of Patent: Oct. 25, 1994

[54] SKYWAVE ADAPTABLE NETWORK TRANSCEIVER APPARATUS AND METHOD USING A STABLE PROBE AND TRAFFIC PROTOCOL

[75] Inventors: Daniel O. Weddle, Plano; C. David Young, Richardson, both of Tex.

[73] Assignee: Rockwell International Corporation, Seal Beach, Calif.

[21] Appl. No.: 993,495

[22] Filed: Dec. 18, 1992

Related U.S. Application Data

[63] Continuation of Ser. No. 639,492, Jan. 9, 1991, abandoned.

[51] Int. Cl.⁵ .......................... H04J 1/00; H04J 4/00; H04B 17/00
[52] U.S. Cl. ........................ 370/50; 370/70; 370/76; 370/120; 455/62; 455/67.4
[58] Field of Search ............... 370/24, 29, 30, 50, 370/69.1, 70, 76, 79, 95.1, 95.3, 120, 121, 124; 375/38, 40; 455/52.1, 62, 67.1, 67.3, 67.4, 68, 70, 71

[56] References Cited

U.S. PATENT DOCUMENTS

| | | | |
|---|---|---|---|
| 4,155,040 | 5/1979 | Harmon et al. | 455/62 |
| 4,328,581 | 5/1982 | Harmon et al. | 455/62 |
| 4,677,617 | 6/1987 | O'Connor et al. | 370/50 |
| 4,780,885 | 10/1988 | Paul et al. | 455/62 |
| 4,866,710 | 9/1989 | Schaeffer | 370/50 |
| 4,868,811 | 9/1989 | Suzuki | 370/50 |
| 4,937,822 | 6/1990 | Weddle et al. | 370/50 |

FOREIGN PATENT DOCUMENTS 0330222  8/1989  European Pat. Off. .............. 370/50

*Primary Examiner*—Alpus H. Hsu
*Attorney, Agent, or Firm*—V. Lawrence Sewell; M. Lee Murrah; H. Fredrick Hamann

[57] ABSTRACT

In the skywave adaptable communication network, the time required to initiate communications between two transceivers can often be an important factor where the propagation characteristics of signals at various frequencies may vary drastically with time. The present invention not only improves upon known prior art by accepting the first frequency that it hears as a communication frequency when two nodes are attempting to communicate from a known list of probe and default frequencies to be transmitted at known times, it uses an "announce and do" protocol to establish initial link-up and to change traffic frequencies or other system parameters once link-up has occurred to obtain coordination between both communicating nodes in a network of communicating nodes. The announce and do protocol requires multiple frequency announcements but the multi-frequency can be traffic frequency and a probe frequency or it can be multiple traffic frequencies whereby there is another communicating channel besides the channel which is involved in the changed system parameters. Once link-up has occurred, the probe signals are used to allow the system to then adaptively change the traffic frequencies to obtain better quality traffic signals, as these better quality probe signals are received, analyzed and compared with the quality of the present working frequency signals.

14 Claims, 7 Drawing Sheets

SKYWAVE ADAPTABLE NETWORK TRANSCEIVER APPARATUS AND METHOD USING A STABLE PROBE AND TRAFFIC PROTOCOL

The present application is a continuation of application Ser. No. 639,492 filed Jan. 9, 1991, now abandoned.

CROSS REFERENCES TO RELATED APPLICATIONS

The present invention is related to those described in U.S. Pat. No. 5,204,855, issued Apr. 20, 1993 to M. G. Bebee, B. C. Miller, D. O. Weddle, W. P. Werth, and C. D. Young and filed as application Ser. No. 639,487 on Jan. 9, 1991, and to U.S. Pat. No. 5,204,856 issued Apr. 20, 1993 to M. G. Bebee, B. C. Miller, D. O. Weddle and C. D. Young, filed as application Ser. No. 638,956 on Jan. 9, 1991.

THE INVENTION

The present invention is generally related to electronics and more specifically related to a network of transceivers attempting communication in high frequency ranges which do not have stable propagation characteristics. Even more specifically, it is related to an approach which minimizes the time required to establish communications between two transceivers in a high frequency network.

BACKGROUND

Adaptive TDMA (time division multiple access) communication systems have been previously designed which dynamically maintain potentially different frequencies between nodes of the communication system using a process of communicating the quality of received signals between the nodes and storing this information so that an optimum frequency band can be selected whereby whenever signal quality deteriorates, an alternate frequency can be selected to provide continued communications. An example of such a system is shown in U.S. Pat. No. 4,937,822, dated 26 June, 1990, and assigned to the same assignee as the present invention. The system outlined in the referenced patent utilized a connectivity phase which could only start a connectivity process on twelve minute intervals distributed at predetermined times throughout the day, and the process used required checking each of a number of prospective frequencies before deciding which signal would be appropriate to use in initial communications. Thus, even under the best propagation conditions, there would be times when a start-up would be attempted immediately after the occurrence of a twelve minute start time interval thereby preventing start-up for as much as almost 24 minutes even when propagation characteristics were favorable. If, in fact, propagation characteristics were unfavorable and other sets of potential frequencies needed to be tried, the connection process could take much longer than could be tolerated in a practical operating environment where nodes of the network need, for some reason or another, to be off-line from time to time and then need to suddenly access the system.

SUMMARY OF THE INVENTION

This long start-up problem is addressed by the present invention in accordance with the following parameters. Each of the nodes operates from a precise clock as was the case in the referenced patent. Further, each of the nodes use a common algorithm such that each node knows exactly what frequency would be attempted by a given neighbor node if that neighbor node were to be transmitting at that time. Thus, each operating node continuously checks a set of frequencies for receipt of signal from other nodes, whether or not the other nodes are operating at that time, to see if start-up is commencing. Since each of the nodes transmits unique preamble signals that identify the source of the transmission, when a given node receives such a transmission identifiable as belonging to a previously assigned neighbor, that node henceforth in transmissions to the node coming on line provides information as to the frequency of the first signal heard as long as the quality of the signal meets minimum standards of quality. As soon as both of the communicants have heard a signal from the other of the stated minimum quality, a connection is declared, and traffic data is transmitted as appropriate. The system continues to search for better frequencies (higher quality) to use in future traffic situations but in the meantime, traffic data can be delivered. The protocol of the present invention is such that half of each transmission and reception time is used for maintenance purposes in trying out new frequencies, and the other half is available for traffic data. Normally, the traffic data portion and the maintenance portion are at different frequencies, and both of the traffic data portion and the maintenance portion are used to provide information to the receiving node as to the frequency to be used for future traffic data as well as the quality of signals received recently on the traffic frequencies. The present concept in typical situations has reduced the connectivity phase from as much as 12 to 24 minutes down to less than two minutes. Typical situations show a drastic improvement since the present invention can declare connectivity and start transmitting traffic data as soon as the new entry into the system (or a node which has lost sychronization for whatever reason) hears from an assigned neighbor and successfully transmits to that neighbor.

The declaration of connection, as established by the present concept, is called by the applicants, an "announce and do" protocol. This protocol, while being described for use in changing traffic frequencies, can be used for changing any system parameters which require coordination at both communicating nodes. This requires both nodes to make changes at substantially the same time if communication is to continue. In other words, if one node wants to transmit at a new frequency, the other node must set its receiver to receive at the new frequency. Similar coordination would be required if it was desired to change the data rate at which traffic data was sent in instances where the quality of the signal was great enough to justify a higher data bit rate.

The present system can accomplish the coordination by using both the probe frequency and the traffic frequency slot during initial link-up and can later use multiple traffic frequencies and the probe after link-up to further increase the stability of the system while operating in a rapidly changing environment as concerns propagation of signals at a given frequency.

The continual intermingling of probe and traffic frequency signals on one or more than one periodic bases not only increases the capability of the system to track propagation changes, but also provides the probe signal control data section as an alternate channel for the required coordination prior to the time additional frequencies are selected for traffic communication.

It is thus an object of the present invention to provide an improved connectivity algorithm for establishing and maintaining traffic data transfer situations between two transceiver nodes which may or may not comprise a part of an overall network.

Other objects and advantages will be apparent from a reading of the specification and appended claims in conjunction with the drawings wherein:

DETAILED DESCRIPTION

Figure 1:
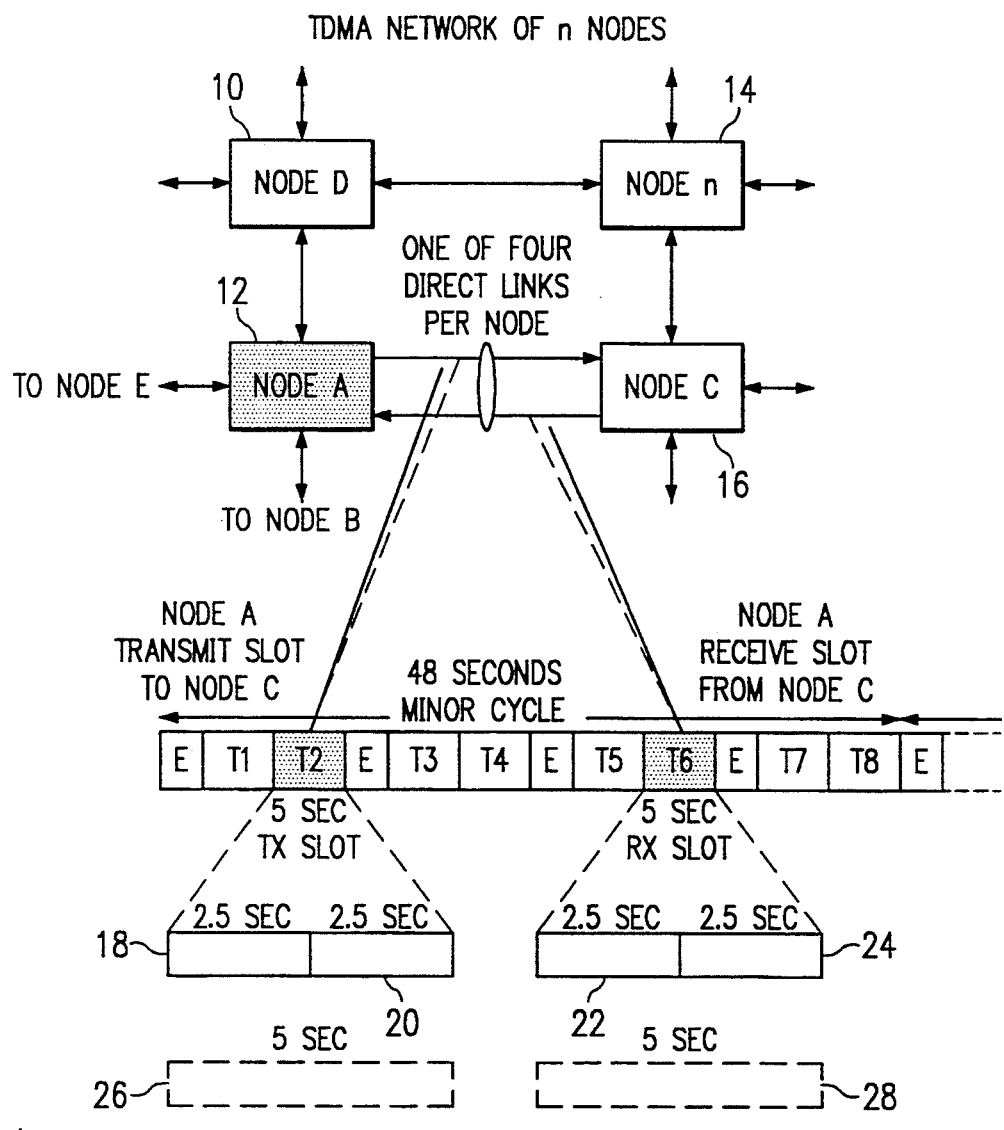
FIG. 1 provides a representation of a data bit stream from a given node to various neighbor nodes, and a further breakdown of the transmit and receive time slots of those communications. This basic protocol is used both in the prior art and the present invention.

In FIG. 1 a plurality of nodes 10, 12, 14 and 16 are shown comprising a portion of a TDMA network of N nodes. As designed in one embodiment of the concept, each node has the capability of directly contacting each of four other nodes in the network. A minor cycle, as illustrated below the nodes, comprises eight time slots. As shown, time slot T2 is used to transmit signals from node A to node C and time slot T6 is used for receiving signals from node C. Time slots T3 and T7 might be used to transmit and receive signals to and from node D, and the other time slots for two other nodes B and E not shown. Time slot T2 is broken down into two portions 18 and 20 while time slot T6 is broken down into portions 22 and 24. The five seconds designated as the time for time slot T2 is also typically broken into two 2.5 second time slots. A dash line block 26 is shown representative of the fact that the entire time slot T2 may (on an exceptional basis in the present invention) be used for a single purpose such as delivery of traffic data. As will be mentioned in conjunction with later figures, a given portion requires a preamble for synchronization by the receiving node and thus, the two synchronization packets used in conjunction with 18 and 20 leave much less time available for transmission of data than would the single packet 26. Thus, packet 26 can deliver several times as much usable traffic data as could the single traffic data portion 18. A similar dash line block 28 represents a long packet combination for the receive time slot. As shown, a minor cycle requires 48 seconds since there are four E or emergency time slots which are not defined and not pertinent to the present invention. The entire minor cycle thus requires not only 40 seconds for the assigned time slots T1 through T8, but eight additional seconds for the four emergency time slots. A minor cycle uses up 48 seconds of time.

Figure 2:
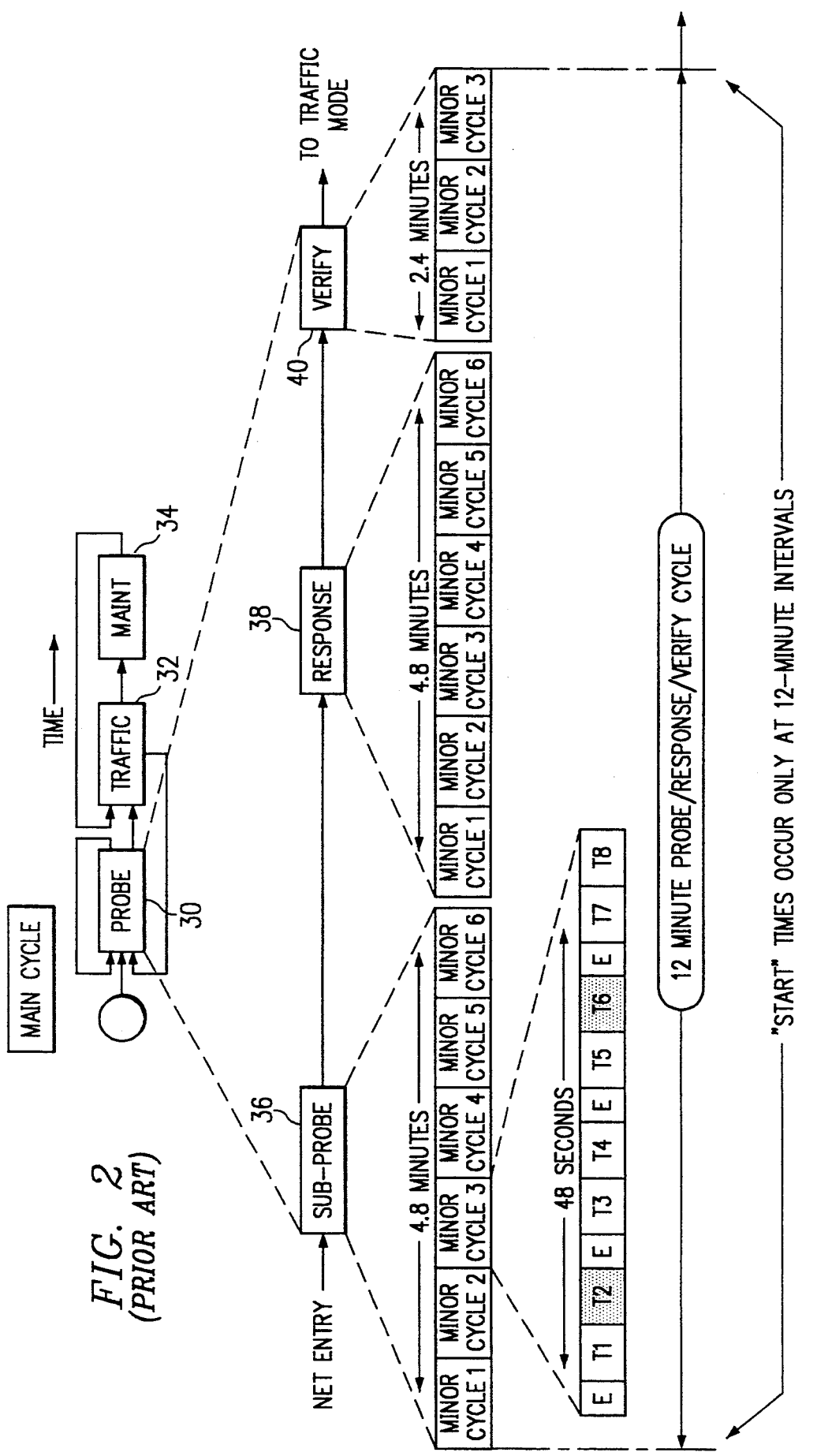
FIG. 2 illustrates the connectivity phase and timing cycle for the prior art approach at establishing communications.

FIG. 2 illustrates that the main cycle of the prior art communication link-up, traffic, and maintenance algorithm was separated into distinct modes with blocks 30, 32 and 34 representing respectively, the probe portion, traffic portion, and maintenance portions of a main cycle. The probe portion 30 was broken down into a sub-probe section 36, a response section 38, and a verify section 40. As will be noted, the sub-probe and response portions each required 4.8 minutes, and the verify portion required 2.4 minutes. Thus, the total time for sending out the various trial frequencies, checking the response, and verifying the information, consumed twelve minutes if one or more frequencies were found in each direction of communication satisfying certain minimum requirements for quality. The device would then proceed to the traffic mode with occasional temporary advances to a maintenance mode to update usable frequencies before returning to a traffic mode. As mentioned previously, the concept required that such a connectivity phase in the prior art system could only start at prescribed twelve minute intervals and thus, a connection process could only be started five times per hour.

Figure 3:
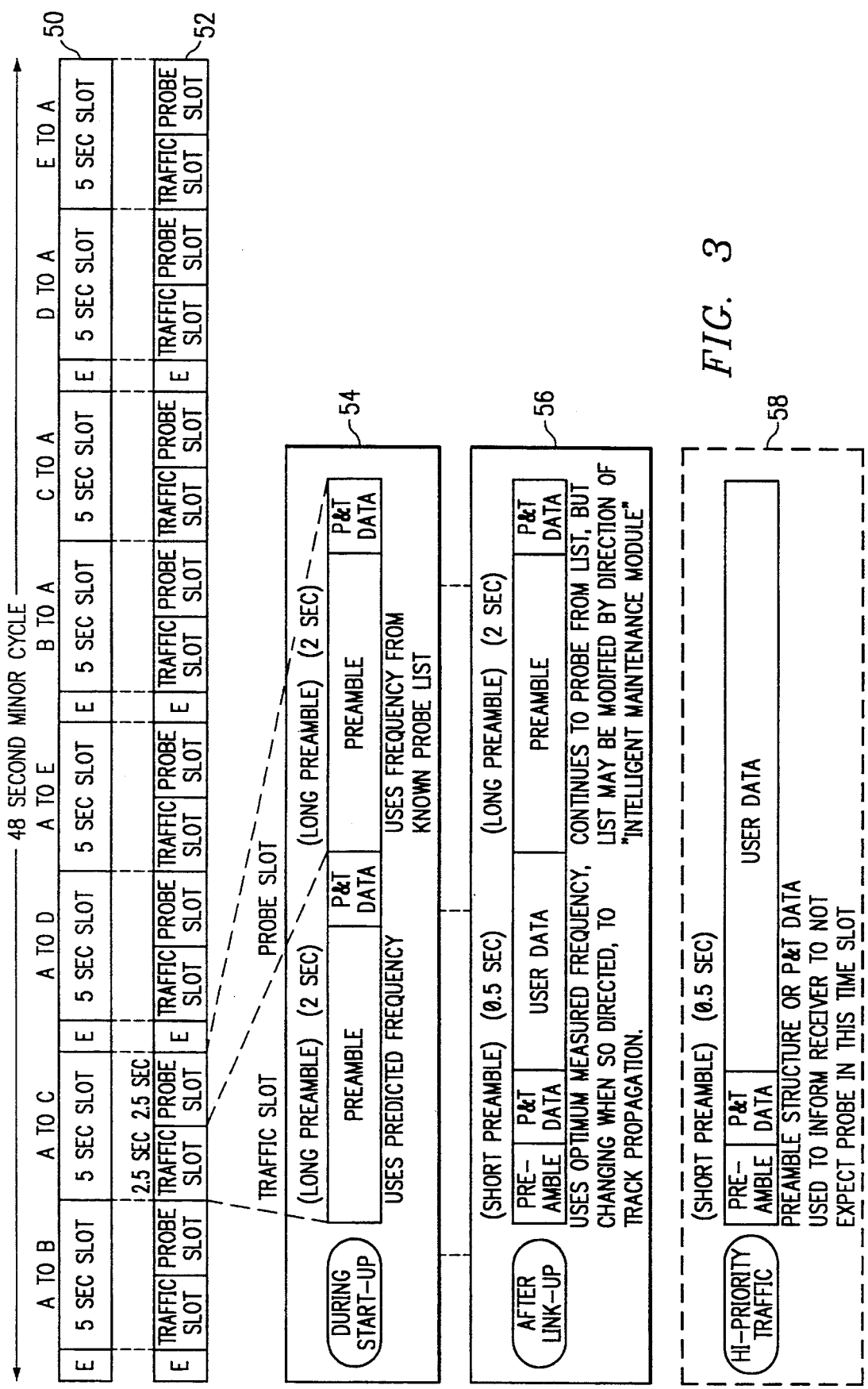
FIG. 3 illustrates the signal types used for maintenance and traffic communications in one embodiment of the present inventive concept.

In FIG. 3 a first .waveform or timing representation 50 illustrates a minor cycle previously illustrated in FIG. 1. It indicates that in the first four traffic slots node A, which is the present node, transmits first to node B, then to node C, then to node D, and then to node E. In the last four traffic slots of the minor cycle, the node receives signals from B, C, D, and E. As shown previously, there are four emergency time slots interspersed in the traffic time slots. Timing representation 52 provides more definition to the timing representation 50. In other words, it indicates that each of the five second time slots for transmission or reception is divided into a traffic slot, and a probe slot each of 2.5 seconds. A timing representation 54 expands upon timing representation 52 and shows, for a typical five second slot, that during start-up the traffic slot may have a two second or long preamble, and the remaining portion of the two and one-half second time slot contains probe and traffic control data. The probe slot also has a long, two second preamble, and the remaining time comprises probe and traffic data identical to that in the traffic slot. The probe and traffic data in one embodiment of the invention, comprised a frequency index, an order wire index, an acknowledgement sequence number, whether or not the apparatus is in a start-up state, and link quality analysis information. While the traffic slot is shown as using a predicted frequency during start-up, this is an optional part of the algorithm for potentially even faster link-up than the basic concept presented herein.

Until link-up is established, the traffic slot cannot be used to pass traffic data. A way of advantageously using this slot is to use either a default frequency, or a predicted frequency and a long preamble to accomplish the functionality of the probe slot. When first starting to probe, the traffic packet of this system must functionally act like a probe packet because the time of arrival is not known. The frequency for transmission may be taken from a default frequency list known at both ends. The way in which the actual value for default frequencies is selected is not an important part of the present inventive concept. However, the defaults are typically selected one time by a designer of the system as the most likely to succeed frequency for the link/path type (in other words, whether the path is long or short, etc.). In one embodiment of the invention the default frequency was based on what was likely to work based on experience, propagation predictions and, where possible, from watching the system work over a period of time. An improvement upon the concept is to use multiple default frequencies which are cycled through in a manner similar to the probe frequencies or as in one embodiment of the present concept where there is continually cycling of the traffic frequencies after more than one best traffic frequency is established.

As a further improvement on the concept, the default frequency table may be modified by a prediction program or an algorithm designed to use recent probe results to select the actual frequencies to be used in the traffic slot at the next occurrence of start-up. In this case, the software doing the job of modifying the default list needs to have the same inputs at both nodes to assure that the selected (predicted) frequencies match. Such a modification would provide a natural place to employ a prediction program whose accuracy (for the next 24 hours) can be greatly improved by measuring the channel propagation characteristics, in a manner similar to that done with the probe signals, and updating the model with the measured value (of the highest frequency found to propagate). This would result in the model's input sun spot number being modified to force it to predict the MUF (maximum usable frequency) as measured. Once this pseudo sun spot number has been determined and exchanged at both ends, both affected transceivers will provide a prediction of the same frequency. Further, these frequencies or "answers" are likely to be much more accurate (i.e., more likely to work) when used within the next twenty-four hours.

Timing representation 56 shows the composition of the time slot after link-up with the traffic slot having a short or 0.28 second preamble, P & T control data, and then user data. The probe time slot remains the same as it did during start-up. As indicated within box 56, the frequencies of the traffic slot use the optimum measured frequencies after link-up, and changes to new frequencies when so directed to track changes in propagation characteristics of the environment. The probe slot, on the other hand, after link-up, continues to probe at frequencies from a predetermined internal list, but in accordance with the overall algorithm of the invention, the list may be modified after link-up by direction of an intelligent maintenance module to be later discussed.

Figure 4:
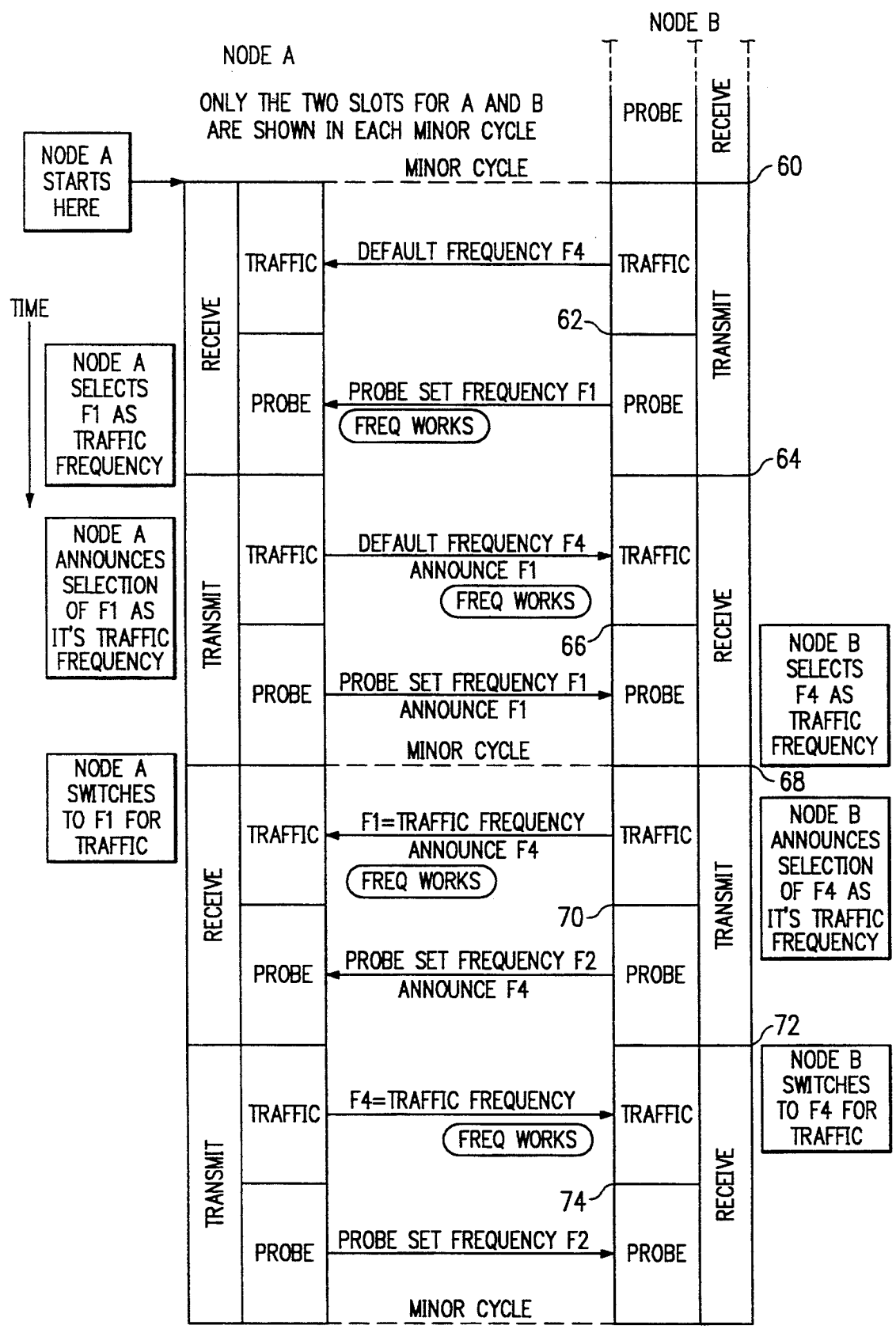
FIG. 4 provides a type of "flow diagram" illustrating the steps occurring in establishing a link-up between two nodes.

In FIG. 4 information is presented as to communications between nodes A and B at a time defined as 60. As illustrated, time is passing in a vertical direction down the figure. At the time indicated as 60, the node A is in a receive mode expecting signals from node B, and node B is accordingly in a transmit mode. To simplify the illustration, only the slots for nodes A and B are shown for each minor cycle. As illustrated, a default frequency F4, which may be a predicted frequency, is transmitted at time 60, and at time 62 a probe frequency is transmitted at frequency F1. For the purposes of discussion, it may be assumed that propagation characteristics are such that node A receives the probe frequency F1 successfully, and due to propagation effects or whatever, the frequency F4 is not successfully received from node B by node A. At time 64, later in the minor cycle, node A transmits traffic on the default or predicted frequency F4, and announces that it has successfully received frequency F1 or, in other words, that the frequency F1 works. At time 66, node A transmits a probe signal at frequency F1 announcing that it is able to successfully receive frequency F1 from B. At this point in time, node A has successfully heard frequency F1, and node B has successfully heard frequency F4. Thus, node A has selected F1 as its traffic frequency, and node B has selected F4 as a traffic frequency. During the next minor cycle starting at a time 68, node B uses the F1 traffic frequency to announce that F4 has been selected by B for future traffic reception. Node A which previously had received traffic at the default or predicted frequency F1 switches to F1 for future traffic, and successfully receives the signal. At time 70 node B transmits a probe at frequency F2 announcing that F4 is its traffic frequency, and as illustrated, the probe signal is not successfully received by node A which is also attempting in accordance with an internal algorithm to receive at frequency F2. At time 72 node A transmits a traffic signal at frequency F4 in accordance with the received announcement at time 68 and node B has switched (actually left in the same condition) to the F4 as its traffic frequency until otherwise advised by node A. The probe signal from node A to node B occurs at time 74. As illustrated, node B does not successfully receive the probe signal F2. However, at time 68 there is a successful link-up since node A is set up to receive traffic signals on frequency F1, and node B is set up to receive traffic signals on frequency F4.

If a predicted frequency had not been used, the system would still have established communications or link-up by probing frequencies defined in the frequency list. Because the same results would have occurred merely using the established set of probe signals, the use of an algorithm to establish a predicted frequency happens to substantially improve early link-up when the prediction is correct but does not harm it if the prediction is incorrect. In any event, the diagram of FIG. 4 is merely to illustrate the operation of the system with or without a predicted or default frequency in the traffic slot prior to actual link-up conditions where the traffic slot is used for traffic information at a frequency that has been established as providing adequate signal quality.

Figure 5:
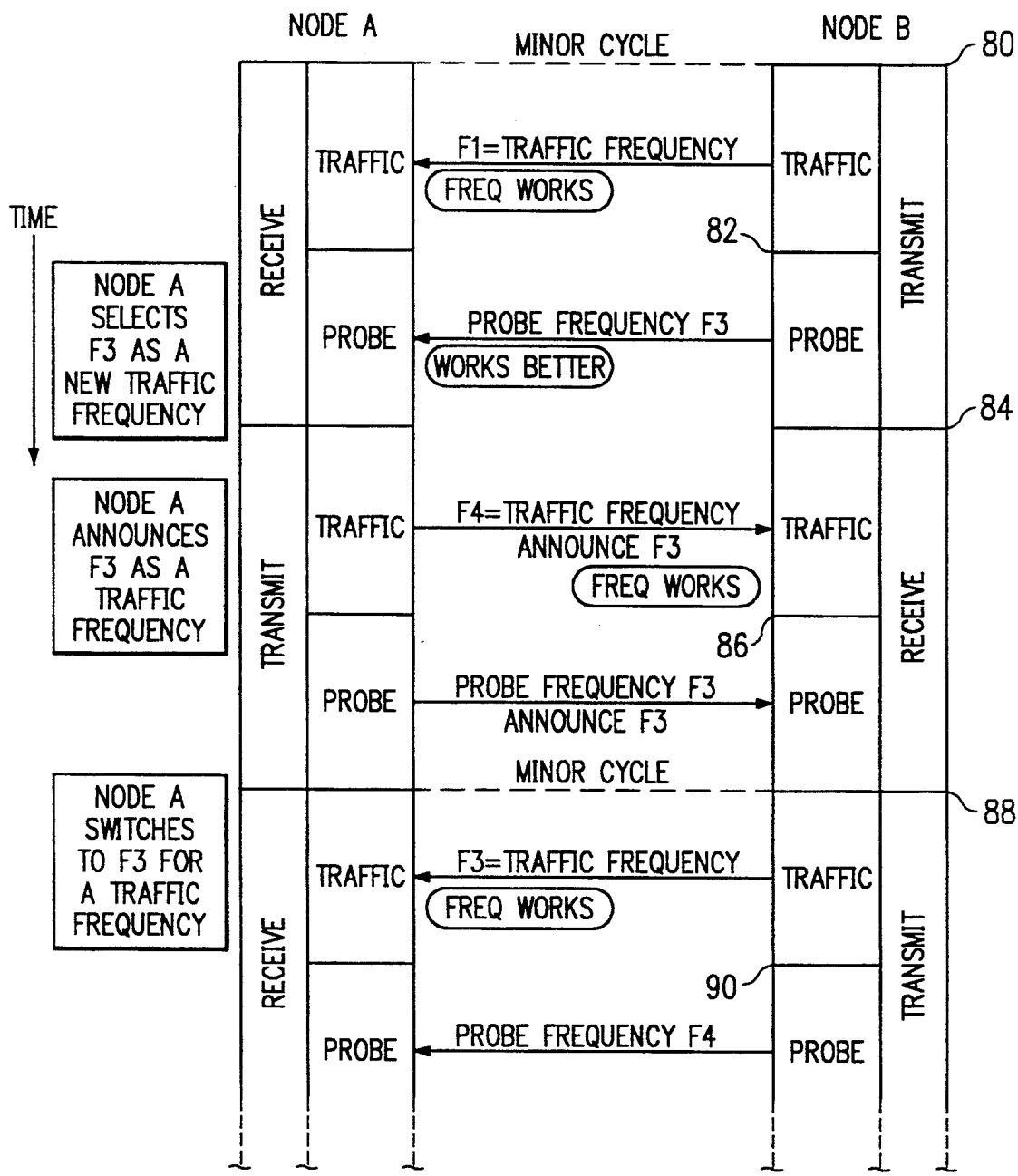
FIG. 5 illustrates the steps involved in adapting to a new frequency for traffic data.

FIG. 5 illustrates a situation where the node A adaptively changes its traffic receiving frequency. At time 80, node B transmits traffic on frequency F1 as previously set up in FIG. 4. At time 82, node B transmits on frequency F3 in accordance with an internal algorithm, and node A successfully receives the probe, and upon analysis, determines that the quality of the signal F3 is better than the quality of the signal received on frequency F1. At time 84 node A in its transmit condition uses the previously set traffic frequency F4 to announce to B that it wants to receive future traffic signals on F3. Node B receives this traffic signal successfully. At time 86 node A on its probe portion of the time slot announces frequency F3 as its desired frequency, and transmits on probe frequency F3. Node B does not successfully receive probe frequency F3 according to the illustration. At time 88 node B in a new minor cycle transmits traffic on F3 as opposed to the previous minor cycle where it used the previously set F1 for the traffic frequency. At this time, node A in its receive traffic portion of the time slot, uses F3 for the first time, and the frequency again works. Node B at time 90 transmits a probe on probe frequency F4 which is not successfully received by node A.

Figure 6:
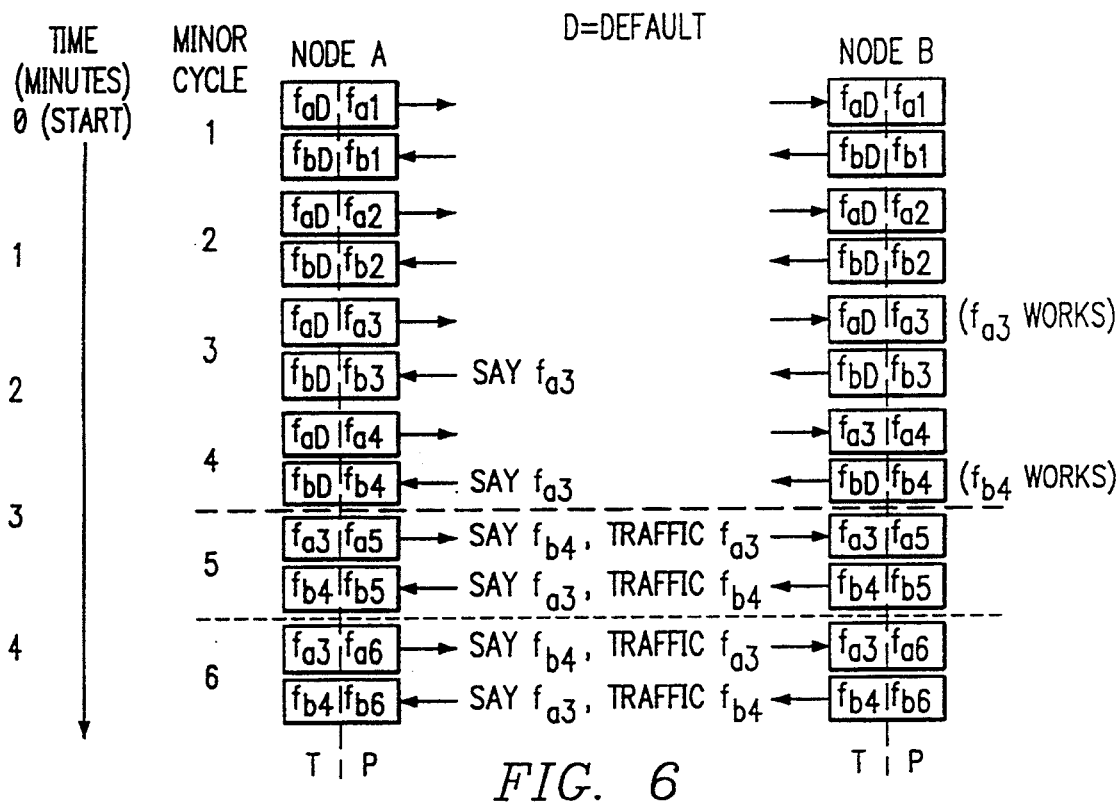
FIGS. 6 and 7 are used to illustrate the difference between the present inventive concept using the approach as basically described, and the possibly even faster link-up using a predictive frequency in the traffic portion of a time slot as a modification of the basic approach since the traffic portion is unused until a link-up is established.

FIG. 6 illustrates an example in which the time required to declare link-up is relatively long if it happens that the default frequencies used in the traffic time slot did not successfully propagate, and the first successful probe frequency is fa3 from node A to node B. As illustrated in minor cycle 4, probe fb4 is successfully received from node B by node A. Thus, traffic can be successfully sent in minor cycle 5. It must be realized that traffic being sent in minor cycle 5 immediately after both nodes have received successfully a probe signal from the other under the "announce-and-do" approach, is, at the very least, one complete minor cycle faster than any known prior art. In other words, the prior art would typically have a required minimum minor cycle 5 to acknowledge successful receipt of a probe signal in both directions before being able to transfer usable traffic in minor cycle 6. The heavy dash line is an indication of the link-up capabilities in an "announce-and-do" mode presented by the present inventive concept, whereas the lighter dashed line between minor cycles 5 and 6 is an indication of the soonest possible declaration of link-up under prior art protocols.

Figure 7:
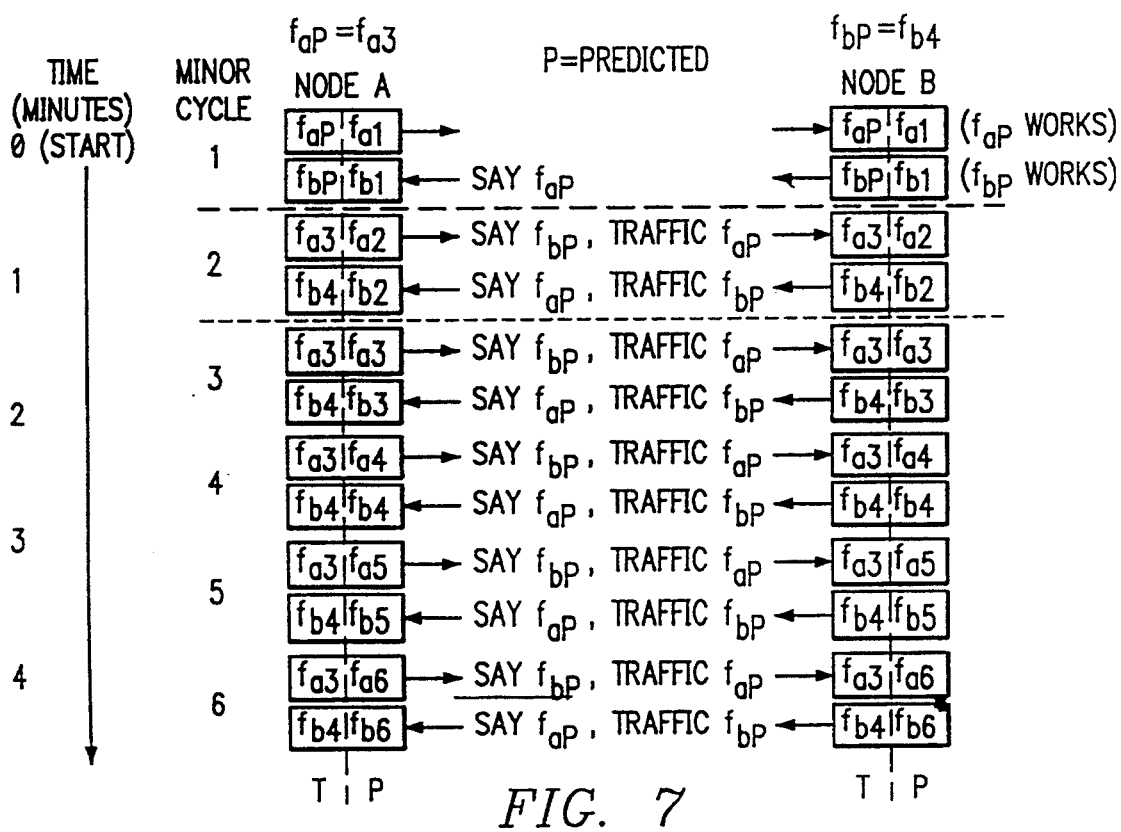

FIG. 7 further illustrates the same environmental conditions as confronted by the example of FIG. 6, except that in this situation a predicted frequency is used in the first time slot as opposed to a default frequency. In the example shown, the predictive frequency happens to be equivalent to fa3 for node A, and happens to be equivalent to fb4 for node B. In such a situation, both nodes will receive the signal occurring in the traffic slot from the other node in the first minor cycle. Using the announce-and-do concept mentioned in connection with FIG. 6, link-up is established by the end of minor cycle 1 and traffic can commence operation in minor cycle 2. On the other hand, even with predictive frequencies, if the minimum acknowledgement requirements of prior art approach is used, link-up could not be established prior to the end of minor cycle 2. Since the predictive frequencies happen to be the same as frequencies fa3 and fb4, these frequencies are shown in the traffic slot for the remainder of the FIG. 7 illustration. However, a further improvement on the concept as mentioned in connection with FIG. 3 and elsewhere in this patent, indicates that the system would typically try to find multiple "best" traffic frequencies so that the traffic signals are continually cycled through a group of traffic frequencies such as the three traffic frequencies used in one embodiment. Thus, the traffic frequencies shown on the left-hand side of each of node A and node B would be changing on a periodic basis in a preferred embodiment of the inventive concept.

While FIG. 7 shows the most ideal results of using predictive frequencies, it can be readily ascertained that in most situations a predictive frequency would produce shorter link-up times than would default frequencies or the absence of transmissions during the traffic time slot. In other words, default or predictive frequencies cannot add to the time required for link-up and under most circumstances, will speed up the link-up process.

Figure 8:
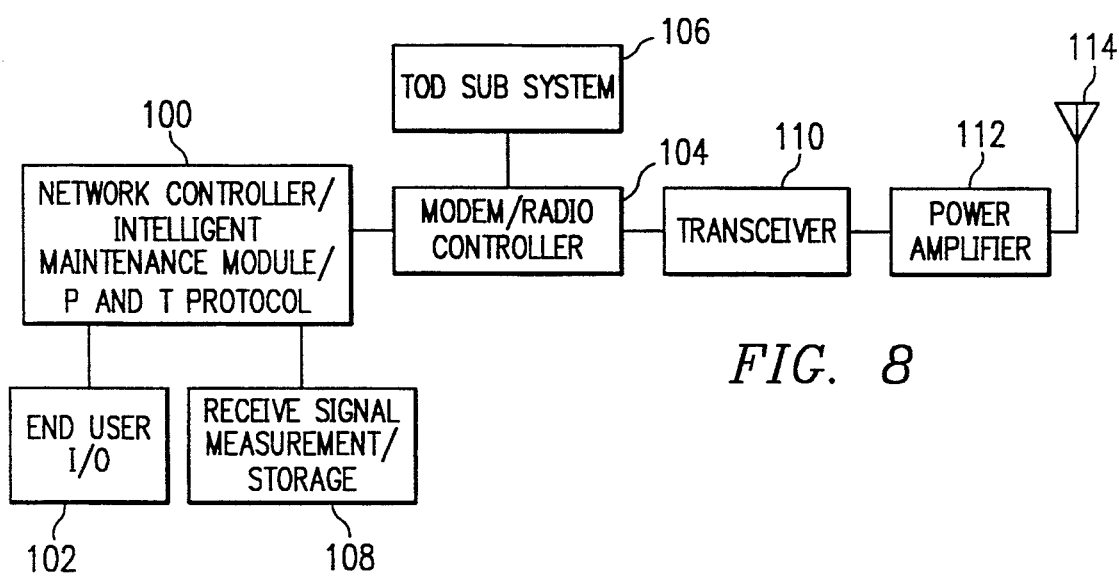
FIG. 8 is a block diagram of the components of a single node or transceiver in a network.

In FIG. 8 a block 100 is shown as a combination network controller which implements the intelligent maintenance module and P & T protocol. It exchanges data with an end user I/O block 102 which could be something as simple as a keyboard and screen from which the operator transmits and receives messages, or any other device for originating and receiving messages. Block 100 is connected to a modem/radio controller 104 which receives time of day information from a block 106 entitled "TOD Subsystem". Block 100 is also connected to a receive signal measurement/storage block 108 which receives signals and provides storage of the measurements made until the stored information is to be used or transmitted to other nodes. Block 104 is connected to a transceiver block 110 which provides signals to a power amplifier 112. Power amplifier 112 is connected to an antenna 114 for transmission of messages or reception of messages from other nodes.

Figure 9:
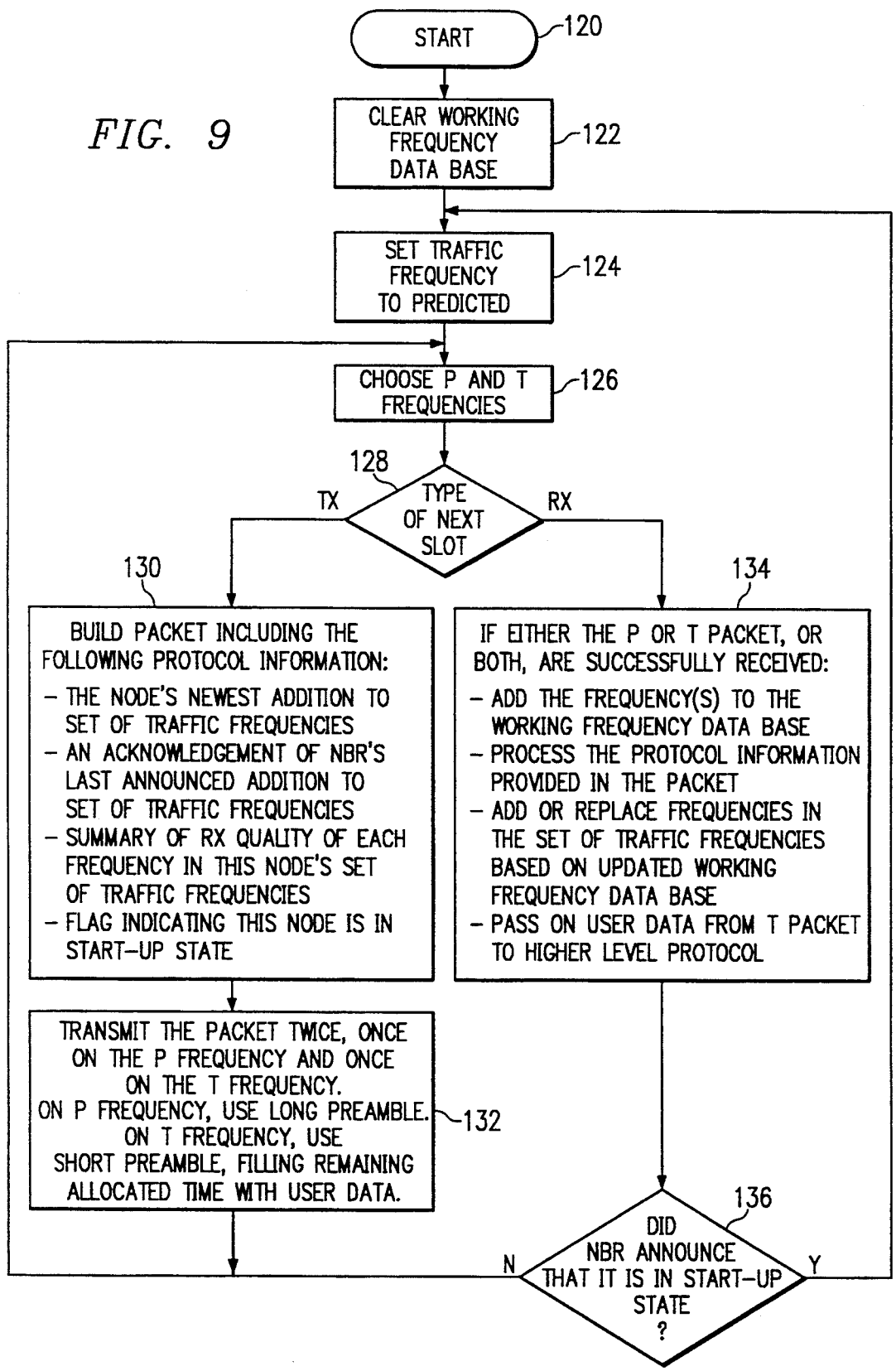
FIG. 9 comprises a high level flow diagram of the process involved by a node in establishing whether to transmit or receive and upon which frequencies and the data to be provided or detected.

FIG. 9 provides a high level flow diagram of the operation of the block 100 of FIG. 8 wherein upon start-up for communication between any given pair of nodes, the apparatus goes from a start-up block 120 to a clear working frequency database of any prior information block 122. The apparatus then goes to block 124 where the traffic frequency is set to some predicted value (if predictive values are to be used in the concept), and then the system proceeds to block 126. If the system is in a start-up condition, the traffic frequency is already set by block 124, and the probe frequencies are derived from a known time related list of probe frequencies comprising part of an internal algorithm. The adaptive nature of the system allows the probe frequencies and the traffic frequencies to change thus, the choosing in block 126 is a continually changing operation. The system then ascertains in a decision block 128 whether the next time slot for communications with a given node is to be a transmit or receive time slot. If it is a transmit time slot, the apparatus continues to block 130, and builds a transmit packet including information relating to the node's newest addition to set of traffic frequencies. It also includes an acknowledgement of the neighbor's last announced addition to the set of traffic frequencies. It further includes a summary of the receive quality of each frequency in the present node's set of traffic frequencies, and finally, includes a flag indicating whether or not the node is in a start-up state. This packet of information relating to protocol is transmitted twice, once on the probe frequency and once on the transmit frequency, in accordance with block 132. When transmitting at the probe frequency, a long preamble is used, and on the traffic frequency, a short preamble is used with the remaining time allocated to user data. (As previously indicated, however, in FIG. 3, the traffic frequency uses a long preamble in the start-up condition.)

If the decision in block 128 is that it is a receive time slot, the system proceeds to block 134, and if either a probe or traffic packet or both are successfully received, the frequency or frequencies are added to the working frequency database. The protocol information received in either one or both packets is processed, and based upon the analysis of the data, or the information in the packet, frequencies are added to or replaced in the set of traffic frequencies in the working frequency database. Further, any user data obtained in the traffic packet is passed to a higher level protocol for transmission to the end user controller represented by block 100 (and storage 108) in FIG. 8. After completing the steps of block 134, the system proceeds to a decision block 136 where it checks to see whether the neighbor announced that it had returned to a start-up state or is commencing in a start-up state. If the determination is that it is in a start-up state, the system returns to block 124 to set the traffic frequency to predicted, but if the neighbor is not in the start-up state, it returns to block 126 to choose the next probe and traffic frequencies.

OPERATION

The prior art system discussed in the patent referenced previously was based on a TDMA network structure in which a link between two neighbors was defined by the time, channel frequency and hop pattern which they mutually shared via a combination of transmit and receive identifiers. Nodes could enter the net only at specific twelve minute start markers. All the nodes in the network used a self-sufficient time source which could be externally synchronized by an external time source (such as a satellite time transmitting device). Thus, all nodes could accurately know when to receive transmissions from assigned neighbor nodes. The protocol used in this prior art system comprised a minor cycle occurring every 48 seconds having four two-second emergency slots and eight five second transmit or receive intervals. Thus, there were four send or transmit slots, one for each of four direct neighbor nodes and four receive slots. The five second slot was normally divided into two two and one-half second packets for probe/response, etc. When connection was made, the full five seconds less preamble time was devoted to traffic. The system, as described, performed a useful function but the present system was designed to provide improved connection times, and to make it more robust (more stable with quickly varying propagation characteristics).

While the prior art system was described as a network, the concept presented there and the one presented here can be practiced by a network of only two transceivers.

The present algorithm is based upon the recognition that since time is accurately known by both nodes in a specific communication sequence, and since both nodes use an identical algorithm for determining frequencies to be used at a specific time with a specific neighbor on a specific day, there should be no need to wait for a start time. The probe sequence can be considered a continuous cycle that can be entered at any time. This set of probe frequencies can be reverted to whenever there is a link loss even though different probe frequencies may be adaptively used once a connection is established. Thus, entry can commence in any given minor cycle whenever a slot assigned to that node occurs.

It was also recognized that connection does not necessarily require the involved procedure of the original design. It was determined that whenever transmissions have been exchanged in both directions on a link (whether it is the same or a different frequency), a connection can be assumed. Further, a speed-up of the linking or connection process can be obtained by rearranging the frequency library on a low-mid-high basis. The probe frequencies may then be selected one from each group on a consecutive basis and then return to the first group for the fourth probe frequency. The end result is that a frequency propagating from one node to the next is likely to be found much more rapidly than simply stepping through all of the frequencies from lowest to highest.

It has also been ascertained that in all normal situations, past experience or algorithms can advantageously be used to predict with reasonable accuracy a frequency that should work at a given time of day between a given set of nodes in a given direction. If a predicted frequency is used as a probe in the traffic slot which is unused during start-up procedures in addition to the normally switched and changing library of probe frequencies, a further link-up improvement is obtained in a majority of link-up attempts.

The system is much more stable in operation since it is more adaptive to changing propagation characteristics. Some applications of the present concept rate a robust system much higher on a value scale than volume of traffic at any given time. If there is an emergency where large volumes of traffic data need to be transmitted for a short period of time, the entire time slot can be used for traffic data on an exceptional basis. By appropriately modifying either the traffic preamble or the data in the P & T control data portion of the slot so that the receiver knows that the data will pre-empt the succeeding probe portion of the time slot, a five second traffic packet can be used when needed. In other words, the entire five second slot can be adaptively used for traffic on a slot-by-slot basis.

The present invention also provides the capability of examining the quality of received signals and adjusting the data rate downward when the signal-to-noise ratio indicates poor signal quality or upward when the quality is high. In addition or in substitution thereof, the power can be increased when the signal-to-noise ratio is poor or reduced when the signal-to-noise ratio rises. The reduction in power provides a benefit in using less power at each node if it is battery operated or in the alternative, provides less interference to other nearby nodes and reduces the possibility of reception by unauthorized receivers.

From the above, it can be ascertained that the present system has a basic system architecture and data format very much like the prior art referenced patent. The present invention digresses in that the received and transmit time slots are typically used in a mode where a first portion is a traffic signal and a second portion is a maintenance portion. These two portions are shown in more detail in FIG. 3 where it indicates that during start-up, the traffic slot when the concept uses a predicted frequency has a long preamble similar to that of the maintenance or probe slot. The referenced patent started out probing from a list of predetermined frequencies and then changed to using the entire five second slot for traffic with occasional returns to maintenance when traffic was light or when there was a problem or, in the absence of either of the previous two reasons, on a periodic basis. The present invention normally has traffic in the first half of each five second slot, and a maintenance probe signal for continuously checking propagation characteristics of the environment to adaptively update the frequencies of the traffic slots to frequencies which provide the best signal-to-noise ratio for a given transmit power output. Once link-up is achieved along the lines shown in FIG. 4 or FIG. 6 where each of the two transceivers attempting communication have heard from the other one, the system uses the format shown in block 56 of FIG. 3 where the traffic slot uses a short preamble, a short P & T data block and the remaining space is available for user data. As shown in dash line block 58, after link-up and in emergency traffic situations, the entire remaining portion of the five second slot after the short preamble and the P & T data may be used on a slot-by-slot basis for user data when there is an emergency in the form of high priority traffic or an exceptionally large amount of traffic data as selected by the end user with the realization that communications could be caused to degrade in the absence of adequate maintenance information exchange.

With the system normally operating in accordance with the data format of block 56 of FIG. 3, the system is continually checking the signal quality of both the traffic data and the probe signals, and as soon as a new frequency signal is received with a signal-to-noise ratio indicating better propagation, the system is modified to operate at the new frequency. In actuality, one embodiment of the invention used three different traffic frequencies on a continually rotating basis when three different frequencies could be found of similar quality. On the other hand, if one frequency had significantly better quality than any other frequency, the system may use only the best quality signal. In other situations, the system algorithm adapted to having the best frequency for two of the three slots in the rotating basis and the remaining slot using the second best frequency.

A further modification in the system operation comprised examining frequencies between the predetermined library of frequencies after link-up is firmly established in the area of signals which are already propagating well to see if there is an even better frequency to be found intermediate presently used signal frequencies.

In one embodiment of the inventive concept, the probe frequencies ranged from two megahertz up to 30 megahertz in substantially equal increments. As will be observed, the frequency difference between probe frequencies is substantial and offers the opportunity by the system to find many frequencies that might propagate better at any given time than the predetermined library of probe frequencies.

The signal, as received by the apparatus of FIG. 8, provides the measurement of the quality of the signal and other characteristics to block 108. The totality of information stored in block 108 is utilized by the intelligent maintenance module portion of block 100 to determine which frequencies should be used by the traffic signals and in what order. The intelligent maintenance module also is the source of instructions for attempting new probe frequencies outside the predetermined library of probe frequencies and where these probe frequencies should be attempted.

The P & T protocol, in combination with block 108, operates by 1) measuring the receive characteristics by taking measurements on all received packets whether traffic or probe and maintaining a database that can be used by higher layer protocols within the system to make decisions about which frequencies worked best at any given time; 2) finding working frequencies by probing a fixed sequence of frequencies known to the two neighboring nodes attempting communication for the purpose of finding new working frequencies for the traffic slot; 3) confirming order wire selections of frequencies by announcing to a neighbor node the selection of a working frequency to receive upon as part of an order wire pair (two frequencies, one selected by each node which together allow bi-directional communications) and the confirmation that the neighboring node has received that information; 4) reporting reception quality by transmitting to the neighbor node in the P & T data section of both the traffic and probe slots as shown in block 56 of FIG. 3 how well it is currently receiving on its order wire frequencies; 5) passing user data or higher level control data that is independent of the probe and traffic (P and T) protocol tool set functions; and 6) recognizing the start-up state of a pair of nodes by recognizing that a neighboring node is in a start-up state from information contained in the P & T data portion of the traffic or probe slots as illustrated in block 130 of FIG. 9. The apparatus returns to a start-up state when it first commences communications or realizes that it has not been in communication with a node for a given period of time. When this occurs, the traffic frequency is "set to predicted" as shown in block 124 of FIG. 9 to start the link-up process from scratch.

The measurements of the receive characteristics of the traffic and probe packets of information may be stored in a database that forms a propagation history of every frequency successfully received. Measurements of signal-to-noise ratio (SNR) and cyclic redundancy code (CRC) error check are used by the intelligent maintenance module 100 of FIG. 8 to constantly select the best working frequencies. Measurements of TOA (time of arrival) and automatic gain control (AGC) setting are used to maximize the receiver's chance of acquiring synchronization with the signal on any particular frequency.

By using a weighted signal-to-noise ratio value where newer samples are given a heavier weight, the intelligent maintenance module can provide a realistic selection of which signal to choose next upon detection of the degradation of a given traffic frequency. The signal-to-noise ratio is also used in selecting the data rate for the user data rate portion of the traffic data illustrated in FIG. 3. In one embodiment of the inventive concept, the signal quality was divided into four quality categories with zero to three decibels being designated as poor reception, and the data rate was set at the lowest and most robust rate or in one case, 75 bits per second. If the signal-to-noise ratio measured for the given traffic frequency was three to seven decibels, the rating was considered nominal reception, and the data rate was set at a less robust rate or 150 bits per second. If the signal-to-noise ratio measurement was eight to eleven decibels, the signal-to-noise ratio was considered good, and the data rate was set to the highest user rate or 300 bits per second (which still retained a one-half rate error detection and correction code). Anything over eleven decibels was considered excellent.

As was mentioned previously, with adequate signal quality, the power of transmission could be reduced either to lessen the possibility of reception of a signal by unauthorized receivers or to lessen the possibility of interference with signals from other nodes with the recognition that if SNR is less than excellent, the data rate may have to be reduced. In other words, if the signal-to-noise ratio were in the eight to eleven decibel range, and the power was reduced such that the signal-to-noise ratio dropped to the three to seven decibel range, a reduction in data rate was necessary to assure proper reception by the receiver of the data without error.

For most applications of the present concept, the user will have an overriding desire of either maximum data rate with good reception or minimum power and thus, for most applications only one of data rate control or power control would be an overriding operational concern until the signal-to-noise ratio was in the greater than eleven db or excellent range, and the other control may then be brought into play while maintaining the top data rate or minimum power level. The CRC measurement is used to detect data errors induced during the transmission. If errors are detected, the data portion of that particular traffic packet is ignored. The CRC measurement is also factored into the weighted signal-to-noise ratio average used to select the best working frequencies. Thus, a CRC error on a received packet for a particular frequency lowers the weighted signal-to-noise ratio average for that frequency. The result could be the selection of a different frequency for future traffic.

The TOA is a relative measure of propagation delay and can be an indicator of the propagation mode. In other words, which ionospheric support layer was used and how many hops the signal traversed enters into the time of arrival. Once the TOA has been measured using a long preamble for a particular frequency, the search algorithm in the receiver can be seeded with this value to shorten the time it takes for the acquisition of synchronization on that frequency, thereby allowing the use of a shorter preamble such as shown in block 56 of FIG. 3 wherein the traffic packet has room for user data capacity in addition to the P & T control data.

Although not pertinent to the inventive concept, the security of the signal transmissions in the present invention may be increased by step changing the frequency of the signal in a pattern known to the receiver from internal algorithms around the frequency being referenced as the traffic frequency or the probe frequency during the entire period of the traffic slot or the probe slot. This frequency step change can occur as often as every single data symbol in the signal transmission. In other words, this frequency change may occur as often as 200 times per second (if a data symbol represents three data bits) while allowing the receiver to still track and correctly receive data symbol indications. The term "data symbol" is used herein because some types of signal transmission combine more than one data bit into a data symbol. Such a signal transmission using FSK or frequency shift keying is employed in one embodiment of the present invention.

When a frequency hopping or stepping approach is used in the system, a way to increase the effectiveness of probing is to take advantage of the frequency hopping waveform to measure the signal-to-noise ratio of each individual frequency within the hop band (the set of frequencies within one bandwidth around the center frequency over which the signal is hopped during a transmission). If the TOA's are found to be fairly constant over a certain part of the spectrum, the hop band of a probe can be widened to include working frequencies over a relatively large range (possibly as much as several megahertz). Such an approach allows a large part of the working spectrum to be monitored very efficiently and keeps the database current while leaving more time to probe for frequencies that are not yet characterized or well-behaved enough for a sweep of various center frequencies to be effective. A possibly non-apparent advantage to making the hop band wide is to increase the anti-jam capability of such transmissions in a hostile environment. Such action on the part of a given pair of nodes would also increase the difficulty of unauthorized reception of such signals.

Once the intelligent maintenance module in block 100 of FIG. 8 has chosen a frequency as part of its order wire pair, information is exchanged with the given neighbor node to establish that frequency. This information is included in the P & T control data portion of all traffic and probe slots to that neighbor. This P & T control data packet includes among other items, an indication as to the frequency that is currently being confirmed and an order wire index specifying which of several order wire reception frequencies is being replaced with the possibility of setting more than one or all order wire reception frequencies to the same frequency. A sequence number may be included to uniquely identify an order wire selection announcement. Such a field is believed appropriate to distinguish new announcements from old ones due to the possibility of packet loss. An acknowledging sequence number is included in the P & T data packet to confirm that the neighboring node has received the last announcement. When a neighbor hears an announcement, it takes the sequence number from the announcement and puts it into the acknowledging sequence number field of all packets transmitted back to the announcing node. When the announcing node successfully receives a packet from the neighbor with an acknowledging sequence number equal to the sequence number of its current announcement, it considers that order wire selection announcement as confirmed and is free to make another selection.

The intelligent maintenance module comprising a part of block 100 in FIG. 8 uses information obtained from the receive signal measurement block 108 to make decisions as to which frequencies to select as order wires and when to replace them. The goal of the intelligent maintenance module 100 is to take advantage of frequency diversity if it is available but not to penalize the system by assigning an order wire reception frequency to a time slot when that frequency is not working well as compared to other potential frequencies. The intelligent maintenance module uses the algorithm following to find the best frequency that is not already one of the order wire frequencies.

If a BEST_NON_OW_FREQ is available then do the following:

CASE: ASSIGN ALL ORDER-WIRES TO ONE ESPECIALLY GOOD FREQ

If no order-wires have been selected (as in start-up), replace all order-wires with the BEST_NON_OW_FREQ.

EXIT ALGORITHM.

CASE: CONFIRM ONE ORDER-WIRE BEFORE SELECTING ANOTHER

Do the following only if no new order-wire is currently being confirmed or if the index of the order-wire to be replaced is the same as the one being confirmed:

CASE: REPLACE WORST ORDER-WIRE IF SOMETHING BETTER AVAILABLE

If the BEST_NON_OW_FREQ has a higher quality than the worst order-wire, replace order-wire with BEST_NON_OW_FREQ. EXIT ALGORITHM.

CASE: SPLIT UP REDUNDANT ORDER-WIRE IF IT IS NO LONGER MUCH BETTER

If more than one order-wire is using the same frequency and the quality of that frequency is no longer significantly better than that of the BEST_NON_OW_FREQ, replace one of the redundant order-wires with BEST_NON_OW_FREQ. EXIT ALGORITHM.

CASE: CONFIRM ONE ORDER-WIRE BEFORE SELECTING ANOTHER

Do the following only if no new order-wire is currently being confirmed or if the index of the order-wire to be replaced is the same as the one being confirmed:

CASE: BEST ORDER-WIRE MUCH BETTER THAN WORST ORDER-WIRE

If the quality of the best order-wire is significantly better than the quality of the worst order-wire, replace the worst order-wire with the best. EXIT ALGORITHM.

CASE: KEEP REDUNDANT ORDER-WIRE ALWAYS THE BEST

If more than one order-wire is using the same frequency and the quality of that frequency is no longer as good or better than that of the best order-wire, replace one of the duplicate order-wires with the best order-wire.

EXIT ALGORITHM.

End If

The intelligent maintenance module in the present invention processes the data every minor cycle for each neighbor immediately following the receive opportunity for that neighbor. It then uses the following transmit time slot to inform the neighboring nodes of its order wire receive frequency selections. The intelligent maintenance module 100 then monitors the status of the confirmation process to know when it is safe to make another selection.

A general description of the P & T order wire frequency confirmation protocol present in various forms in FIGS. 4 through 7, is as follows. The order wire reception frequency may be called "RX FREQ" because it is a frequency this node would like to receive on. (The other half of the order wire pair, the frequency this node transmits on to its neighbor is called a "TX FREQ".) When a node decides that it would like to replace one of its RX FREQ's, it starts announcing the new RX FREQ in all probe and traffic packets. If the neighbor correctly receives a packet, it will make a note of the new RX FREQ by storing it as its corresponding TX FREQ and announce that it heard the new RX FREQ in all probe and traffic packets going back to the original node. If the original node then hears a subsequent packet from this neighbor, it will interpret the protocol information and conclude that the new RX FREQ has been confirmed. At this point, the confirmation is complete and the original node is free to change to another RX FREQ if necessary. This means that under ideal conditions the node can change an RX FREQ every P & T cycle. This protocol is an implementation of a more general protocol designated as a "Reciprocal Parameter Change" (RPC) protocol. The RPC protocol is used to establish parameters that must be known at both ends of a link before they will work. The present protocol algorithm in effect states that any new parameter becomes effective immediately, and the node will continue announcing the parameter until it is ready to change to another. This approach was taken because it was decided that it does not do any good to postpone making the new parameter effective until after the node has confirmation that its neighbor has heard the announcement. Since the loss of a packet in either direction is always a possibility, there is no way to guarantee that the switchover to the new parameter will be perfectly coordinated. Thus, it was decided that a new parameter might as well be made effective immediately thereby avoiding the hitless complexity of trying to determine when the optimal moment to switch might be. Compared to the prior art approach, experience has illustrated the desirability of the present approach. It is recognized that a new RX frequency will be unusable until the neighbor actually hears a packet from that node. However, under many conditions, there will be two other RX frequencies which will not be changed before the neighbor receives the information as to the changed frequency on one of the various frequencies being received over a period of time. These RX frequencies will continue to be used to complete the handshake between neighbor nodes as will the probe frequencies whose packet contains the same information. The extensive time and frequency diversity makes the system robust even in the face of constantly changing propagation characteristics. In the worst case where all traffic frequencies fail at once, the system will be able to detect this situation quickly and make adjustments as soon as working frequencies are found via the library of probe signal frequencies. In this case, a node will commence using whatever frequency is found to be working to replace all of its previously listed RX frequencies at once via the same mechanism that it uses to replace a single RX frequency as would be the case at initial start-up time.

In the basic P & T implementation shown herein, the system uses one-half of the available time for probing various frequencies other than the currently selected traffic frequencies. This probing is used to maintain fresh knowledge of propagation conditions. In normal circumstances, this amount of probing is more than adequate to track the channel. Radio silent users and/or other users interested in minimizing the frequency of probe occurrence for any reason (such as minimizing self interference, saving power, minimizing probability of detection or minimizing the spectrum used to prevent interference to others) may be interested in alternative versions of the present concept. The alternate embodiments discussed infra accomplish the overall protocol objectives with less frequent probes and an attendant lower, but still adequate for given conditions, performance in channel tracking ability.

One alternate embodiment approach is to dynamically or permanently reduce the rate of the probe. In this embodiment the system may complete a probe set of some amount such as 48 different frequency bands, and then announce using the control data section of the P & T transmissions to each neighbor independently a predetermined value which would be used as an indication of the frequency of probe transmissions desired. The value could be used to select one of the four following example reduced probe rates.

a. transmit only every other minor cycle
b. transmit only every third minor cycle
c. transmit according to the time table
time=night time>>transmit every 5th minor cycle
time=day time>>transmit every 10th minor cycle
time=transition (sun rise/set) transmit every minor cycle In this approach the nodes would determine the definitions of "day""night" and "transition" times according to a commonly held algorithm.

d. transmit every minor cycle

Such an approach would involve a given neighbor node responding to the announcement by changing a sequence number in the control data upon receipt of the value which, when we received by the originating node, turns off the announcement of the value. Once the announcement is turned off, the node is free to change the value again to allow it to continue to track and control the connectivity or link-up process. The links between each pair of associated transceivers is set independently in each direction and independent of other links by any given receiving node.

The approach discussed immediately above, having a reduced rate of probe from the basic embodiment, provides several advantages. First, it does not increase the probability of two nodes being out of phase when one of them suddenly loses the link and requires a new start-up or initiation process. This is because the normal frequency monitored during a "probe absent minor cycle" is the same one used to initialize the link. If a packet of information is received from a given neighbor node in the start-up state, this situation is announced in the control data portion of the time slot and the normal link-up routine would be used to relearn the channel. A second advantage is that this approach could very adequately be used to track a channel for a high frequency station having only a few frequencies to select from such as day, night, transition up and transition down. Third, the approach requires the transmission of only a few bits to change the rate of the probes while drastically changing time available for traffic information. It will be realized, however, that this approach has the disadvantage that it is not as responsive to channel variations as the basic embodiment described and illustrated previously.

A second alternate embodiment approach is to turn off probing entirely at some point after an adequate number of traffic frequencies have been selected and are being successfully used. As one or more of the traffic channel frequencies show degradation, a bit can be set in the control data portion of the traffic packet to inform the other node that probing is being temporarily resumed. The degradation, depending upon environmental conditions, may take several hours or a few minutes, depending upon time of day and overall propagation conditions. The nodes can then immediately start transmitting probes again. Since both ends of a given link monitor the probe set frequencies in the probe slots after turning off the probes, either end can start retransmitting at any time and expect to be heard. The resumption of probing may be continued until satisfactory new traffic frequencies are found and the requesting node sets a bit to stop probing again.

This approach of turning off the probing has definite advantages in situations where radio silence of certain nodes may be desirable. It does, however, have a disadvantage of not being as responsive, as mentioned in respect to the reduced rate of probe concept mentioned previously. Also, it has the added disadvantage that if a link is suddenly lost, it cannot be recognized quickly since the packets expected could be only a few traffic packets sent by users (unless a scheduled "keep alive" traffic packet is periodically sent).

A further alternate embodiment approach of the present concept which tends to reduce interference, but does not increase traffic, is to continue sending probes after the required number of traffic frequencies has been satisfied, but sending the probes at reduced power until further the number of satisfactory traffic signals is reduced below a predetermined value.

All of the discussion to date has involved a system wherein the probe and traffic signals share a common time slot. However, substantially the same robustness of the system may be obtained by doubling the frequency of the minor cycle through the process of dividing the time for the transmit and receive slots in half wherein probe signals are transmitted in one minor cycle and traffic signals are transmitted in the next minor cycle. This approach has the disadvantage of being slower to respond to changes than the presently disclosed preferred embodiment of probe and traffic signal coordination. However, the approach is mentioned for completeness of disclosure.

It should be realized that a further adaptation of the present inventive concept is to, on a coordinated basis between two transceivers, decide to change the probe set that is being actively analyzed from the values stored internally and used in connection with any start-up situation. Such a change could be initiated for any of various environmental situations.

The main object of the concept is to intermix probe and traffic signals on a basis recognized by both nodes of a communicating pair with the added capability of changing the intermixing schedule or process on a demand or controlled basis. The interleaving or intermixing of probe and traffic signals provides continually updated information as to frequencies that are successfully propagating wherein comparisons can be made to the quality of frequencies presently being used for traffic so that decisions can be made to change to better frequencies and thereby maintain communications under adverse conditions.

We have described a communications approach for establishing communication between two transceivers in an environment where signal propagation characteristics vary widely and thus, the two transceivers must continually check the characteristics of the environment via an analysis of received signals and adapt the frequencies used by traffic data as the environment changes. A normal use of this concept would be in a network of nodes wherein data is typically transmitted from node to node as part of a relay system in getting information from one user to another user. The approach very basically uses an approach wherein there are always maintenance functions of some type on every transmission and normally there will be probing of various frequencies in the available frequency spectrum to adaptively set the system traffic frequencies to the best available frequency at that moment in time. Time efficiency of start-up is enhanced by permitting synchronization to start in any minor cycle rather than waiting for a prescribed time, by using predictive frequencies in addition to a library of frequencies where the predictive frequency is based upon some type of experience algorithm and by placing the probe frequencies in groups so that the probe process quickly covers the available band in discrete, but broad, jumps. Once link-up is established, the data rate and/or power of transmission may be modified in accordance with the quality of signal transmissions received to optimize the data rate or other appropriate data signal reception characteristics.

It is believed that with the information provided as to the thinking behind each of the approaches that adequate information has been provided for anyone skilled in the art to program the network controller 100 and modem 104 of the apparatus of FIG. 8 wherein all of the referenced functions can be performed.

We do not limit our invention to the embodiment illustrated and described but only by the scope of the appended claims wherein we claim:

1. A network of identical transceiver nodes for relaying traffic messages from node where each node can communicate with multiple predetermined neighbor nodes on a time multiplexed basis with separate time slots for transmitting each of said neighbor nodes intermixed with further separate time slots for receiving from said neighbor nodes, each of said nodes having a unique identification assigned thereto and each of said nodes comprising, in combination:

list means for causing initially transmitted probe signals to any given neighbor node to be at a base carrier frequency ascertained in accordance with a predetermined list of frequencies and a given frequency-time algorithm;

preamble means for generating a network-unique signature synchronization preamble based upon a unique identification assigned to an intended receiving node in the preamble, wherein a receiving node can establish synchronization preparatory to receiving data;

data supplying means for providing control and traffic data to be transmitted;

probe transmission means, connected to said list means, and data supplying means and said preamble means, for normally transmitting, as a probe signal, a first predetermined duration preamble and then a first predetermined number of control data bits in one of first and second portions of a transmit time slot where said first predetermined duration preamble is of a duration sufficient to resolve uncertainties in the time of arrival of the beginning of a probe on a given probe carrier frequency, to enable recognition, by a given receiving neighbor node, of the presence of a probe and the beginning of a data portion following the preamble;

traffic transmission means, connected to said list means, and said data supplying means and said preamble means, for normally transmitting, as a traffic signal after a condition of link-up has been recognized by a node, a second predetermined duration preamble and then a second predetermined number of data bits in the other of said first and second portions of the transmit time slot, the second duration preamble being substantially less in duration than said first duration preamble while being sufficient to resolve uncertainties in the time of arrival after approximate time of arrival has been measured and stored for a given traffic carrier frequency, to enable the recognition, by a given receiving neighbor node, of the presence of a traffic preamble and the beginning of data following the preamble;

receiving and measuring means for receiving probe transmissions of different base probe carrier frequencies and measuring the quality and time of reception, relative to a reference, of the receiving transmissions; and means, connected to said data supplying means, for informing a given neighbor node of a carrier frequency to be used for future traffic preamble and data portions.

2. The network of claim 1, further comprising:

clock means at each node for maintaining an accurate time relative to a common reference used by all nodes in the network; and said means for informing further uses at least one of the data portions following the probe and traffic preambles, for recognizing a link-up condition subsequent to the initial successful receipt of a probe and for adaptively coping with changing environmental conditions that affect traffic carrier frequency signal quality.

3. The network of claim 1, wherein each of said nodes additionally includes:

means for transmitting a preamble, different from said first and second duration preambles normally transmitted, to a given neighbor node to inform said given neighbor node that the entire remaining portion of the time slot will be used for priority data rather than said first duration preamble and control data bits normally transmitted.

4. The network as claimed in claim 1, wherein:

said receiving and measuring means includes means for measuring the quality of traffic transmission received and comparing same to other recent measurements of probe transmissions; and said means for informing includes means for adaptively informing each given neighbor node of the best frequencies to use for traffic transmission as this information is ascertained by said receiving and measuring means.

5. A method of coordinating operating system changes in two remotely situated transceivers operating on a time multiplexed basis wherein communication therebetween occurs at at least two different frequencies each occurring at periodic rates comprising the steps of:

establishing at least two separate frequency time multiplexed communication links between two transceivers with at least one of said links having a high probability of accurately transferring information between said transceivers, the occurrence of at least a pair of attempted communications in each direction being defined as a minor cycle;

announcing, by transmission from one transceiver to the other on said at least two separate communication links during a given minor cycle, changes desired by one transceiver to be made in a selected one of the communication links and affecting the ability of both transceivers to continue to communicate on the selected link; and doing adjustments in operation to make the changes announced without waiting for confirmation from the other transceiver wherein successful operation on the selected communication link probes an indication that the other transceiver received the announced change.

6. The method of claim 5, wherein said changes include an announced new frequency of operation for receiving signals transmitted from the other transceiver on the selected communication link; and said adjustments in operation include setting the one transceiver to the announced new receiving frequency during the time for reception of signals on the selected communication link.

7. A method of establishing and optimizing traffic communication conditions between neighbor nodes in a network of operationally identical transceiver nodes having at least two nodes where each node has a periodically occurring transmit time slot, including at least initially first and second portions for transmitting signals to each of multiple neighbor nodes and a further periodically occurring and similarly structured receive time slot for receiving signals from each of said neighbor nodes comprising the steps of:

maintaining an accurate time relative to a common reference used by all nodes in the network;

initially transmitting probe signals to any given neighbor node of said N neighbor nodes at a base carrier frequency ascertained in accordance with a predetermined list of frequencies and a given frequency-time algorithm;

generating a network-unique signature preamble, wherein a receiving node can detect which signals appearing in the environment are intended for that receiving node and establish synchronization preparatory to receiving data;

normally transmitting, as a probe signal, a first predetermined duration preamble and then a first predetermined number of control data bits in one of said first and second portions of a transmit time slot;

normally transmitting, as a traffic signal, a second predetermined duration preamble and then a second predetermined number of data bits in the other of said first and second portions of the transmit time slot, the second duration preamble being substantially less in a duration than said first duration preamble;

measuring the quality and time of reception, relative to a reference, of received probe transmissions of different base probe carrier frequencies; and informing a given neighbor node of a carrier frequency to be used for future traffic preamble and data portions, using at least one of the data portions following the probe and traffic preambles.

8. The method of claim 7, wherein said first predetermined duration preamble is of a duration sufficient to resolve uncertainties in the time of arrival of the beginning of a probe on a given probe carrier frequency, to enable recognition, by a given receiving neighbor node, of the presence of a probe and the beginning of a data portion following the preamble;

said normally transmitting of said traffic signal is after condition of link-up has been recognized by a node;

said method further includes the step of maintaining a list of working frequencies, their time of reception and their quality of determining which frequencies should be used to receive traffic from each of said neighbor node; and said informing is performed for recognizing a link-up condition subsequent to the initial successful receipt of a probe.

9. The method of claim 8, wherein the second duration preamble, while being substantially less in duration than said first duration preamble is sufficient to resolve uncertainties in the time of arrival after approximate time of arrival has been measured and stored for a given traffic carrier frequency, to enable the recognition, by a given receiving neighbor node, of the presence of a traffic preamble and the beginning of data following the preamble; and said informing is additionally performed for adapting to changing environmental conditions that affect traffic carrier frequency signal quality.

10. A method of establishing and maintaining communication between two transceiver nodes in a frequency environment where a given frequency cannot be depended upon to always provide satisfactory transmission and reception of signals, each transceiver node having a unique assigned node designation and each having assigned time slots for transmitting signals and for receiving signals on a time multiplexed basis, the receiving and transmitting time slots normally including probe and traffic portions, comprising the steps of:

transmitting, from one node to the other node, probe preamble signals of a frequency and a preamble pattern unique to said other node, the preamble signal frequency being selected by a time, frequency and node designation algorithm from a wide frequency range library of frequencies;

informing the other node of the frequency of the first received signals meeting minimum quality standards, in a data section of at least one of said traffic and probe transmission portions, and attempting reception of future traffic portion signals at the frequency most recently established by said informing;

dynamically maintaining traffic portion communications at the best known frequency continuously monitoring the quality of signals received in both the traffic and probe portions and informing the other node of changes to be made on the frequency of future traffic portion signals when better quality signals are detected as compared to the frequency presently being used in the traffic portion.

11. The method of claim 10 comprising the additional step of breaking up the library of frequencies to be initially tried in the probe transmissions into High, Medium, and Low frequency groups and cyclically selecting one from each group for the probe transmission frequency to minimize the time required to establish link-up.

12. The method of claim 10 comprising the additional step of temporarily using the both of the probe and traffic portions of a time slot for preemptive traffic.

13. The method of claim 10 comprising the additional step of adaptively adjusting the library of probe frequencies used by said other node by informing the other node to substitute specified probe frequencies for at least some of the listed library of frequencies in accordance with a predetermined set of parameters.

14. A system for establishing communication, including the use of suitable transmission frequencies, between two transceivers having assigned time slots for transmitting and receiving signals to and from each other on a time multiplexed basis, with the receiving and transmitting time slots each being comprised of two possibly separate portions, said system comprising:

means for establishing a common time base for the transmitting and receiving time slots at both transceivers;

means at the first transceiver for transmitting periodically, prior to link-up, link-up probe signals in the transmitting time slot at transmission frequencies according to a frequency-time arrangement known to both transceivers;

means at the second transceiver for receiving the link-up probe signals in a corresponding receiving time slot;

means at the second transceiver for analyzing the signal quality of signals received in the receiving time slot and for identifying the transmission frequency of the first of the analyzed signals to meet a minimum quality standard;

means at the second transceiver for transmitting an indication of the identified frequency to the first transceiver; and means at the second transceiver for attempting reception of signals from the first transceiver at the identified frequency, without waiting for an acknowledgement from the first transceiver of the indication of the identified frequency.

* * * * *